United States Patent

Van Namen

[15] 3,669,444

[45] June 13, 1972

[54] CARD HANDLING APPARATUS FOR CARDS IN DATA PROCESSING MACHINES

[72] Inventor: Frederik Tjado Van Namen, Nijmegen, Netherlands

[73] Assignee: The Singer Company, Rochester, N.Y.

[22] Filed: Oct. 6, 1970

[21] Appl. No.: 78,422

[52] U.S. Cl. ................................271/3, 271/51, 271/DIG. 9
[51] Int. Cl. .......................................B65h 5/06, B65h 29/20
[58] Field of Search..........................271/3, 4, 51, 64, DIG. 9

[56] References Cited

UNITED STATES PATENTS

| | | | |
|---|---|---|---|
| 3,556,513 | 1/1971 | Howard | 271/4 |
| 3,438,621 | 4/1969 | Tajima | 271/3 |
| 1,743,158 | 1/1930 | Morse | 271/3 UX |
| 3,100,113 | 8/1963 | Bennett et al. | 271/3 UX |

*Primary Examiner*—Joseph Wegbreit
*Attorney*—George W. Killian, Patrick J. Schlesinger, Charles R. Lepchinsky and Jay M. Cantor

[57] ABSTRACT

The invention relates to an apparatus for transferring a data card, such as a magnetic stripe ledger card, from a first card guide channel, which leads from the card feed entrance, into a working position or station, to a second card guide channel which leads from said working position to a parking or waiting position. The apparatus comprises means which cooperates with the card feed mechanism and with the card to be parked, and while maintaining that cooperation, transfers the card from the first card guide channel to the second card guide channel and holds it in said second card guide channel, pending a requirement to return the card to the first card guide channel for a subsequent use or operation on the card. The two card guide channels have a common section and a selectively operated pivotal vane guides the card from said first channel to said second channel.

11 Claims, 3 Drawing Figures

INVENTOR
Frederik Tjado van Namen

BY George W. Killian
AGENT

CARD HANDLING APPARATUS FOR CARDS IN DATA PROCESSING MACHINES

BACKGROUND OF THE INVENTION

Parking techniques are known in which a card is introduced into a feeding mechanism and read, after which the card, on command, is passed to a waiting station, from which at any desired moment, it can be brought back again into printing position. In conventional prior art apparatus, after reading data from a card to be parked, the data is first stored in a memory intended for that purpose, and then the card is passed to the waiting station.

Printing of the data to be recalled from the memory takes place after the card has been retrieved from the parking position and returned to the working position wherein the results of additional calculations, carried out while the card was parked, will be printed.

SUMMARY OF THE INVENTION

The object of the present invention is to provide an apparatus which makes it possible to read the card only at the moment it is returned to the normal working position and then simultaneously print the card, thus doing away with the need to provide a separate memory intended for a card to be parked.

According to the invention, this object is attained by a means which comprises at least one flat vane element, capable of pivoting about a horizontal shaft, while a remote section of said vane element can freely move within an opening provided for that purpose in the normal card guide channel, and a driving shaft, the rotation of which is derived from a bidirectional motor, the vane element, when in a first position, abuts against a friction cushion on a disc mounted on the shaft.

In a favorable embodiment of the apparatus, according to the invention, the pivoting vane element is rigidly coupled to a horizontal shaft which may be selectively and reciprocally rotated a few degrees about its axis by a spring-loaded lever element, which derives its movement from a solenoid. This structure assures that the vane element can be selectively pivoted on command.

THE DRAWING

The apparatus according to the invention will now be described with reference to the accompanying drawing, in which FIG. 1 shows a back elevation of the apparatus according to the invention, with twin vane elements intended for handling magnetic stripe ledger cards;

DESCRIPTION

Figure 1:
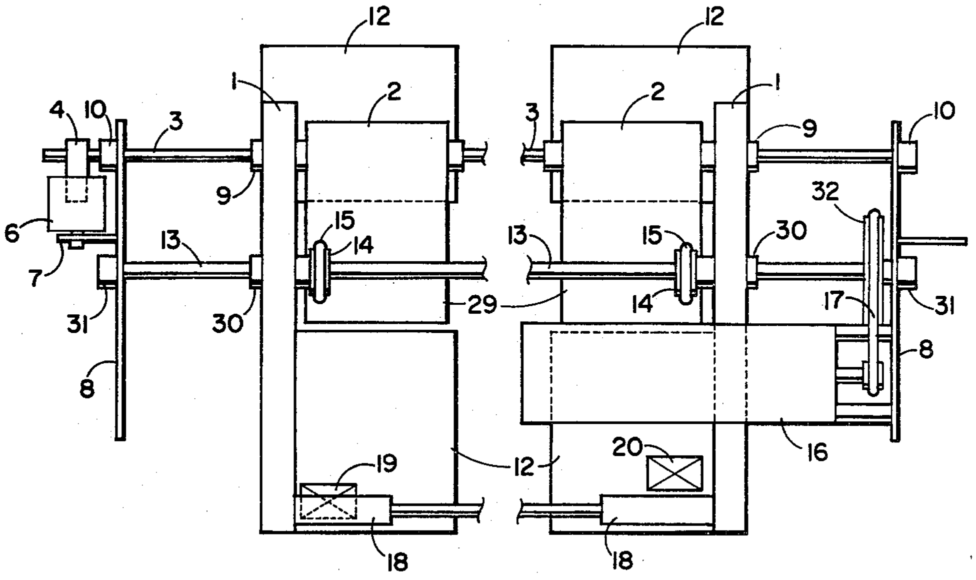
Figure 3:
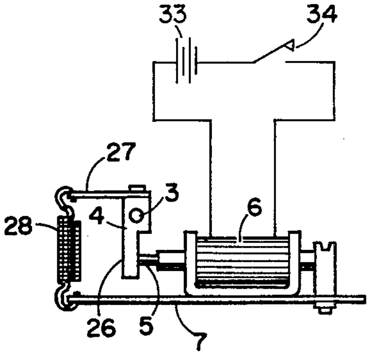
FIG. 3 is a view of the vane control mechanism.

The apparatus according to the invention as shown in FIG. 1 consists of two frame plates 1, between which the vane elements 2, are rigidly coupled to a shaft 3, which may be reciprocally pivoted a few degrees about its axis. The horizontal distance between the two frame plates 1 is determined by the width of the magnetic stripe ledger cards to be used. Means is usually provided for adjusting the horizontal distance between the two frame plates 1 by providing a means for adjusting the relative position of one or both of the structures which include the frame plates 1. That is, one or both of the structures including the frame plates 1 may be selectively moved along the axis of shafts 3 and 13.

On one of the ends of the shaft 3, a bell crank lever element 4 is fitted, resting with one end 26 against a rod 5, which is mounted within the core of an electric coil 6, and with the other end 27 of said bell crank lever element 4 connected by means of a spring 28 to the baseplate 7 on which the coil 6 is mounted. This baseplate 7 is part of one of the two mounting plates 8 of the frame. The shaft 3 passes through slide bearings 9 of the frame plates 1 and is supported at each end by means of the bearings 10, fitted on the mounting plates 8. The portion 29 of the vane element 2 which is remote from shaft 3 pivots freely in the area 11 between the upper and lower portions of the card guide plate 12. A second shaft 13 is mounted and supported by side bearings 30 and end bearings 31 all in a manner which is similar to that used for shaft 3. Affixed to the shaft 13 are two discs 14, having around their circumference a friction cushion 15. The shaft 13 is positioned in such a way that the lower portion 29 of vane element 2 in one of its pivoted positions abuts against said friction cushion 15. The shaft 13 derives its rotating movement from a bidirection motor 16, which is coupled to the shaft 13 by a power transmission belt 17 which engages pulley 32, which is affixed near one end of shaft 13.

Prior to describing further details of the apparatus, it should be observed that the apparatus of the invention can be positioned on any of a variety of existing printers of a data processing machine. Accordingly, a printer for magnetic stripe ledger cards will not be disclosed herein, as such printer does not form a part of the invention, and they are well known to those acquainted with the art.

Figure 2:
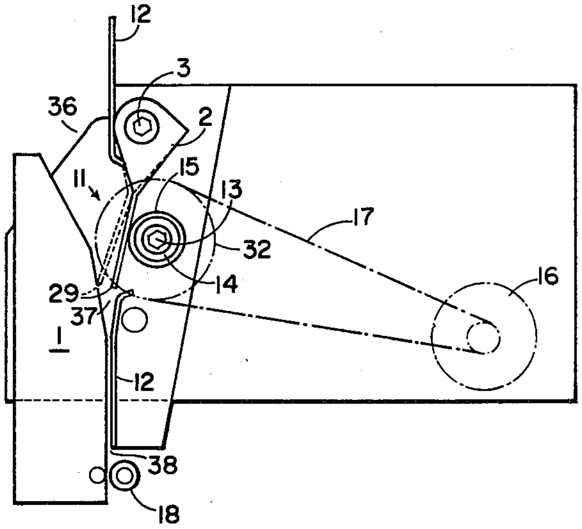
FIG. 2 shows a side elevation of the apparatus according to the invention.

When using the apparatus of the invention, a card may be inserted at entrance 36 into a first card guide channel comprising the entrance 36, area 37 and exit 38. By means of two pairs of conventional friction rollers or belts (not shown) but situated between the two similar assemblies of FIG. 1, the card may be lowered to the work station of the printer. The feeding device is also provided with a magnetic reading head 19 and a photo-electric control element 20. The operation of the apparatus according to the invention is as follows:

When a certain card (not shown) is to be brought into parking position, the card will first be inserted in the normal way at entrance 36 and transported towards exit 38 until the trailing edge of the card is below area 37. That is, the card may be manually inserted at entrance 36 as seen in FIG. 2 and transported past area 37 through a first card guide channel which guides the card between frame plate 1 and the lower portion of guide plate 12 until the lower portion of the card contacts friction rollers 18 which then assist in the feeding of the card. The friction rollers 18 are suitably mounted and rotated, by means not shown but which are well known to those familiar with card transport devices. The two pairs of friction rollers 18 guide the card in a downward direction through exit 38 as viewed in FIG. 2 to the printing position. During this operation, the reading head 19 is normally switched off. Before the trailing edge of the card emerges from the first card guide channel at exit 38, the friction rollers 18 stop on command of the photo-electric cell 20, when it detects the passing of the trailing edge of the card, after which the rollers 18 start rotating in an opposite direction, thus driving the card in an upward or reverse direction. Simultaneously, the electric coil 6 may be selectively energized, and when it is the vane elements 2 are pivoted into their working position as shown by the dotted lines in FIG. 2 and thereby close the first card channel and direct the rising card from area 37 to a second card guide channel which is to the right of the vane 2 as seen in FIG. 2. The second card guide channel is between the vane element 2 and the disc 14. The upwardly moving card is now guided along the underside, or right-hand side, or the vane elements 2, which are in working position. When the upper edge of the card has been raised to the level of the disc 14, the coil 6 is de-energized, with the result that the vane elements 2 fall back into their resting position as a result of the action of spring 28 of the lever element 4. The upper edge of the card is thus gripped between the vane elements 2 and the friction cushions 15. The driving motor 16 had already been brought into clockwise rotation (as viewed in FIG. 2), simultaneously with the energizing of the coil 6. The coil 6 is energized from power supply 33 when switch 34 is closed. The operation of switch 34 may be suitably controlled in a manner well known to those skilled in related arts. For example, the switch 34 may be closed in synchronism with the cessation of forward rotation of rollers 18; and the switch 34 could be opened in response to a suitable mechanical sensor or photo-electric cell, not shown. The cooperation of the discs 14 and the vane elements 2 will cause the card to be moved further in an upward direction and into the second card guide channel or waiting position. The motor 16 rotates for a predetermined period of time which is sufficient to bring the card into its highest position and to such an extent that at least a part of the card remains gripped between the vane elements 2 and the friction cushions 15; the card is now in parking position. On command, the card can be returned to the printing position, for which purpose the movements of the various components are repeated, but now in reversed direction. The reading head 19 is now switched on, enabling the card to be printed with the data to be "read" from the magnetic stripe and simultaneously with the results of additional calculations carried out meanwhile.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. A card handling apparatus comprising:

a. a guide plate having first and second sections;

b. a frame plate positioned near said sections of said guide plate and cooperating therewith to form a first card guide channel having an entrance and exit for guiding a card towards a work station near said exit of said first card guide channel;

c. bidirectional rollers near the exit of said first card guide channel for engaging a card and selectively transporting it in said first card guide channel and to or from the work station after the card has been inserted into the entrance of said first card guide channel;

d. a vane element situated between said first and second sections of said guide plate for forming an effective portion of said guide plate during the bidirectional transportation of a card between said entrance of said first card guide channel and said work station;

e. a shaft coupled to said vane;

f. control means for selectively pivoting said vane by the angular rotation of said shaft about its axis;

g. said vane, when pivoted by said control means, including channel control means for closing said first card guide channel and for opening a second card guide channel into which a card may be selectively driven as it is extracted from said work station by said bidirectional rollers.

2. The combination as set forth in claim 1 and including card driving means associated with said second card guide channel for cooperating in the extraction of the card from the work station when the card has entered said second card guide channel.

3. The combination as set forth in claim 2 and wherein said vane comprises part of said card driving means.

4. A card handling mechanism comprising:

a. a guide plate having first and second sections;

b. a frame plate cooperating with said first and second sections of said guide plate to form a first card guide channel;

c. a vane element situated between said first and second sections of said guide plate;

d. control means for pivoting said vane element between first and second positions wherein, 1. said vane element, when in said first position, is substantially contiguous with the said first and second sections of said guide plate for more fully defining the limits of said first card guide channel, and
2. said vane element, when in said second position, closes said first card guide channel and forms a second card guide channel which has at least a part thereof in common with said first card guide channel;

e. card propulsion means cooperating with said vane element for transporting cards into and out of said second card guide channel, from and to, respectively, said part of said first card guide channel which is common with said second card guide channel; and f. second card propulsion means cooperating with said frame plate for transporting cards into and out of said part of said first card guide channel which is common with said second card guide channel.

5. The combination as set forth in claim 4 and including sensing means to detect the instantaneous position of a card in said first card guide channel and for causing said second card propulsion means to reverse its driving direction when a card has reached a predetermined position in said first card guide channel.

6. The combination as set forth in claim 5 wherein said control means shifts said vane element from said first position to said second position when a card has reached said predetermined position in said first card guide channel.

7. The combination as set forth in claim 6 wherein said control means shifts said vane element from said second position to said first position when a card has reached a second predetermined position with at least part of said card in the part of said second card guide channel which is not common with said first card guide channel.

8. The combination as set forth in claim 7 wherein both of said card propulsion means comprises friction drives.

9. The combination as set forth in claim 7 wherein said vane element is coupled to a shaft which is selectively rotated a few degrees about its axis by said control means.

10. The combination as set forth in claim 9 wherein said control means comprises a bell crank coupled to said shaft and a solenoid actuator.

11. The combination as set forth in claim 10 wherein said sensing means comprises a sensor for sensing when a predetermined portion of a card has reached said predetermined location.

* * * * *